(12) United States Patent
Ito et al.

(10) Patent No.: US 12,362,372 B2
(45) Date of Patent: Jul. 15, 2025

(54) FUEL CELL SYSTEM

(71) Applicant: TOYOTA JIDOSHA KABUSHIKI KAISHA, Toyota (JP)

(72) Inventors: Masayuki Ito, Shizuoka-ken (JP); Nobuyuki Kitamura, Yamanashi-ken (JP); Takahiro Umehara, Susono (JP); Tomohiko Kaneko, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 485 days.

(21) Appl. No.: 17/805,578

(22) Filed: Jun. 6, 2022

(65) Prior Publication Data

US 2022/0399556 A1 Dec. 15, 2022

(30) Foreign Application Priority Data

Jun. 7, 2021 (JP) ................................ 2021-095048

(51) Int. Cl.
*H01M 8/04537* (2016.01)
*H01M 8/04858* (2016.01)

(52) U.S. Cl.
CPC ... *H01M 8/04641* (2013.01); *H01M 8/04567* (2013.01); *H01M 8/04597* (2013.01); *H01M 8/04873* (2013.01); *H01M 8/04902* (2013.01)

(58) Field of Classification Search
CPC ......... H01M 8/04313; H01M 8/04537–04559; H01M 8/04574–04589;
(Continued)

(56) References Cited

U.S. PATENT DOCUMENTS

2008/0116873 A1* 5/2008 Takada ................ H01M 8/0494
323/299
2009/0117427 A1 5/2009 Manabe et al.
(Continued)

FOREIGN PATENT DOCUMENTS

JP 2008098134 A 4/2008
JP 2013145692 A 7/2013
(Continued)

OTHER PUBLICATIONS

Machine translation of Manabe, WO 2013-042200. Originally available Mar. 28, 2013. (Year: 2013).*
(Continued)

*Primary Examiner* — Jonathan Crepeau
*Assistant Examiner* — Jacob Buchanan
(74) *Attorney, Agent, or Firm* — Dickinson Wright, PLLC

(57) ABSTRACT

To provide a fuel cell system configured to appropriately measure the AC impedance of a fuel cell. A fuel cell system wherein a controller controls ON and OFF of switches of n phases; wherein the controller monitors current values of coils; the controller operates the switches of the n phases at different phases; wherein the controller operates duty ratios of the switches of the n phases with periodically increasing and decreasing them, and the controller measures an AC impedance of a fuel cell from a current waveform of and a voltage waveform of the fuel cell; and wherein, when the controller determines that a predetermined condition 1 is met, the controller makes amplitudes which increase and decrease the duty ratios large compared to other operating conditions.

4 Claims, 9 Drawing Sheets

(58) Field of Classification Search
CPC .......... H01M 8/04604–04619; H01M 8/04634–04649; H01M 8/04664–04679; H01M 8/04694; H01M 8/04858–0488; H01M 8/04895–0491; H01M 8/04925–0494; H01M 8/04949–04952
See application file for complete search history.

(56) References Cited

U.S. PATENT DOCUMENTS

| | | | |
|---|---|---|---|
| 2010/0013490 A1 | 1/2010 | Manabe et al. | |
| 2017/0244336 A1 | 8/2017 | Kitamoto | |
| 2017/0244337 A1* | 8/2017 | Kitamoto | B60L 50/70 |
| 2018/0054151 A1* | 2/2018 | Matsumoto | H01M 8/04589 |
| 2019/0052171 A1 | 2/2019 | Kitamoto | |

FOREIGN PATENT DOCUMENTS

| | | |
|---|---|---|
| JP | 2014232681 A | 12/2014 |
| JP | 2014235781 A | 12/2014 |
| JP | 2017153242 A | 8/2017 |
| WO | 2013/042200 A1 | 3/2013 |

OTHER PUBLICATIONS

Wang Hanqing et al., "Online electrochemical impedance spectroscopy detection integrated with step-up converter for fuel cell electric vehicle", International Journal of Hydrogen Energy, vol. 44, No. 2, pp. 1110-1121, XP085564511, ISSN: 0360-3199, DOI:10.1016/J.IJHYDENE. 2018.10.242.

John Gallagher, "Coupled Inductors Improve Multiphase Buck Efficiency", Jan. 1, 2012 (Jan. 1, 2012), pp. 1-7, XP055516030, Retrieved from the Internet: URL:http://www.power.pulseelectronics.com/hubfs/Inductors/Pulse-Power-BU-Coupled-Inductors-Improve-Buck-Efficiency.pdf [retrieved on Oct. 16, 2018].

* cited by examiner

FUEL CELL SYSTEM

TECHNICAL FIELD

The disclosure relates to a fuel cell system.

BACKGROUND

Various studies have been made on the converter provided in a system mounted and used in a vehicle such as a fuel cell electric vehicle. In a DC/DC converter used in various electronic devices and the like, a circuit composed of a reactor, a switch, a diode, a capacitor and so on, is used often. By ON/OFF signals of the switch, the DC/DC converter controls the increasing and decreasing of current flowing through the reactor.

For example, Patent Literature 1 discloses a fuel cell system in which the AC impedance of a fuel cell stack can be measured precisely.

Patent Literature 2 discloses a fuel cell system mounted in a vehicle, which is capable of highly accurately measuring the impedance of a fuel cell without being influenced by load fluctuation of auxiliary equipment.

Patent Literature 3 discloses an impedance measuring method for calculating a highly accurate impedance in a short time by simple device and configuration.

Patent Literature 4 discloses a fuel cell system in which an AC voltage for measuring the impedance of a fuel cell is accurately applied to the fuel cell, by using a bidirectional step up/down converter provided with a dead time.

Patent Literature 5 discloses a power supply system capable of detecting the state of a power supply, while maintaining control stability to a converter for converting the voltage of electric power supplied from the power supply.

Patent Literature 1: Japanese Patent Application Laid-Open (JP-A) No. 2008-098134
Patent Literature 2: JP-A No. 2014-232681
Patent Literature 3: JP-A No. 2013-145692
Patent Literature 4: JP-A No. 2014-235781
Patent Literature 5: JP-A No. 2017-153242

The AC impedance of a fuel cell is used as an indicator for optimal control of the operating state of the fuel cell. A converter controls the step-up and step-down of the output voltage of the fuel cell, by switching the output voltage using a switching element (switch). It is known that in the converter, there is a response performance decrease region corresponding to a change in duty ratio. When the AC impedance of the fuel cell is measured in the response performance decrease region, the accuracy of superimposing high frequency signals from the converter to the fuel cell decreases. Accordingly, there is a problem in that the accuracy of the AC impedance measurement remarkably decreases.

A possible choice aimed at achieving a small-sized converter is to introduce a magnetically coupled converter including a magnetically coupled reactor in which several coils are magnetically coupled on the same core. In the magnetically coupled converter, to relax the magnetic saturation of the core of the reactor and reduce output current ripple, it is general to alternately switch the magnetically coupled coils so that the same duty ratios are the same the phase differences are equally spaced. When the power output from the fuel cell is low, the magnetically coupled reactor is operated in a discontinuous mode including the period of time in which the currents flowing through the coils are zero.

The existence of a "dead zone" was newly found. In the dead zone, during the operation of the reactor in the discontinuous mode in which current interruption occurs, the switches are put into a pseud switch-on state by a negative current that is passed from other coils by mutual inductance, which is a phenomenon specific to magnetically coupled reactors, and the switches cannot be smoothly switched from ON to OFF; moreover, the output current value of the fuel cell cannot be changed even when the duty ratios are changed. In the dead zone, even if an AC signal for AC impedance measurement is tried to be applied by changing the duty ratio, as described above, since the output current value of the fuel cell is nearly unchanged, the AC impedance of the fuel cell cannot be appropriately measured. This corresponds to the response performance decrease region of Patent Literature 1, and since the period of time in which the AC impedance is not measured or in which the AC impedance cannot be measured occurs frequently, there is a possibility that the fuel cell operating state cannot be optimally controlled.

SUMMARY

The disclosed embodiments were achieved in light of the above circumstances. An object of the disclosed embodiments is to provide a fuel cell system configured to appropriately measure the AC impedance of a fuel cell.

The fuel cell system of the present disclosure is a fuel cell system,
  wherein the fuel cell system comprises a fuel cell and a converter for carrying out at least one selected from the group consisting of step-up and step-down of output voltage of the fuel cell;
  wherein the converter comprises:
    a reactor comprising coils of n phases (n is an integer of 2 or more), which are magnetically coupled to each other,
    switches of the n phases, which are connected to the coils, and
    a controller;
  wherein the controller controls ON and OFF of the switches of the n phases;
  wherein the controller monitors current values of the coils;
  wherein the controller operates the switches of the n phases at different phases;
  wherein the controller operates duty ratios of the switches of the n phases with periodically increasing and decreasing them, and the controller measures an AC impedance of the fuel cell from a current waveform of and a voltage waveform of the fuel cell; and
  wherein, when the controller determines that the following condition 1 is met, the controller makes amplitudes which increase and decrease the duty ratios large compared to other operating conditions:
  Condition 1: an operating condition in which, when the switches of the n phases are operated at different phases, and when currents flowing through the coils are in a discontinuous mode and a current value flowing through the coil of one of the n phases is kept at zero, the switch connected to the coil of at least one of the remaining phases is switched from ON to OFF.

The controller may operate the switches of the n phases at a phase difference of $(360/n)°$.

The controller may determine whether or not the condition 1 is met, from current waveforms flowing through the coils just before the measurement of the AC impedance of the fuel cell.

When the duty ratios of the switches of the n phases are increased and decreased so that amplitudes of the current values of the coils become normal amplitudes, and when the measured amplitudes of the current values of the coils are smaller than an expected value, the controller may determine that the condition 1 is met.

When n is 2 (n=2) and the switches of the two magnetically coupled phases are operated at a phase difference of 180°, the controller may determine that the condition 1 is met when the currents flowing through the coils are in the discontinuous mode and the duty ratios of the switches of the two phases are less than 50% (D<0.5) and satisfy any one of the following formulae (A) and (B):

$$D < \{(1/2)(L-M)(V_H - V_L)\} / (LV_L + MV_L - MV_H) \quad \text{Formula (A)}$$

$$D < (1/2)\{1 - (V_L / V_H)\} \quad \text{Formula (B)}$$

where L is self-inductance of the reactor; M is mutual inductance of the reactor; $V_H$ is an outlet voltage of the converter; $V_L$ is an inlet voltage of the converter; and D is the duty ratio (-).

In the fuel cell system of the present disclosure,
the controller may preliminarily store a data group showing a relationship between the inlet voltage of the converter, the outlet voltage of the converter, the duty ratios of the switches and the current values of the coils, and
when the controller determines that the condition 1 is met, the controller may refer to the data group and make the amplitudes which increase and decrease the duty ratios of the switches of the n phases, large compared to other operating conditions.

In the fuel cell system of the present disclosure,
the controller may confirm whether or not there is a request for AC impedance measurement of the fuel cell;
when the controller confirms that there is a request for AC impedance measurement of the fuel cell, the controller may determine whether or not the condition 1 is met; and
when the controller determines that the condition 1 is met, the controller may make the amplitudes which increase and decrease the duty ratios of the switches of the n phases, large compared to other operating conditions, and the controller may measure the AC impedance of the fuel cell.

By the fuel cell system of the disclosed embodiments, the AC impedance of the fuel cell is appropriately measured.

BRIEF DESCRIPTION OF THE DRAWINGS

In the accompanying drawings.

DETAILED DESCRIPTION

The fuel cell system of the present disclosure is a fuel cell system,
wherein the fuel cell system comprises a fuel cell and a converter for carrying out at least one selected from the group consisting of step-up and step-down of output voltage of the fuel cell;
wherein the converter comprises:
a reactor comprising coils of n phases (n is an integer of 2 or more), which are magnetically coupled to each other,
switches of the n phases, which are connected to the coils, and
a controller;
wherein the controller controls ON and OFF of the switches of the n phases;
wherein the controller monitors current values of the coils;
wherein the controller operates the switches of the n phases at different phases;
wherein the controller operates duty ratios of the switches of the n phases with periodically increasing and decreasing them, and the controller measures an AC impedance of the fuel cell from a current waveform of and a voltage waveform of the fuel cell; and wherein, when the controller determines that the following condition 1 is met, the controller makes amplitudes which increase and decrease the duty ratios large compared to other operating conditions:

Condition 1: an operating condition in which, when the switches of the n phases are operated at different phases, and when currents flowing through the coils are in a discontinuous mode and a current value flowing through the coil of one of the n phases is kept at zero, the switch connected to the coil of at least one of the remaining phases is switched from ON to OFF.

In the present disclosure, in the operating condition in which the dead zone, which is a phenomenon specific to a magnetically coupled reactor, occurs, the duty ratios are increased and decreased so that target current amplitude values are larger than other operating conditions. Accordingly, amplitudes are imparted to the actual currents, and AC impedance measurement is appropriately carried out.

Figure 2:
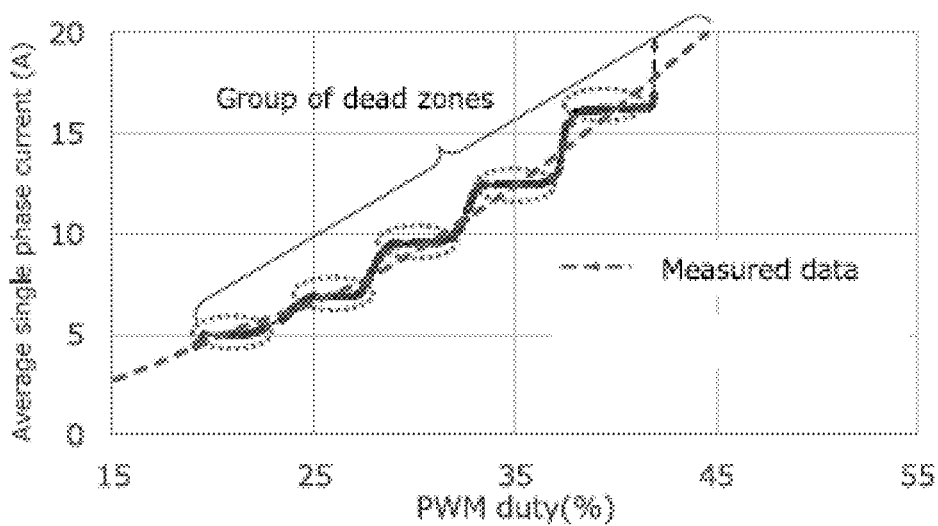
FIG. 2 is a graph of a change in the average current value flowing through each of the coils of the reactor (the average single phase current value) when the magnetically coupled coils of two phases are operated at an input voltage (Vfc) of 200 V, an output voltage (Vh) of 350 V and a constant step-up ratio, and the duty ratio is gradually increased.

The relationship between the duty ratios of the switches of the converter and the reactor current is not a linear relationship and shows different slopes depending on operating conditions. When the relationship corresponds to the condition 1, considering a difference in slope, the switches are switched so that the amplitudes of the currents in the relation become large. More specifically, the duty ratios may be increased and decreased on the basis of the duty ratio/current characteristic curves shown in FIG. 10, FIG. 2 and so on so that the currents are increased and decreased with a larger amplitude than the dead zone current interval as shown in FIG. 2 so that the magnetically coupled n phases step over the dead zone and the currents increase and decrease.

Like the above-described structure, by controlling the duty ratios so that the currents step over a current interval in which the dead zone occurs and the currents increase and decrease, even in a region where the dead zone occurs, the currents are certainly increased and decreased and a sine curve is superimposed. Accordingly, the AC impedance is appropriately measured.

In general, when the currents are increased and decreased, with respect to a request from the fuel cell system, the output of the fuel cell is excess or deficient, and a battery needs to cover the excess or deficiency. However, since the battery is deteriorated and the lifetime is shortened by charge and discharge of the battery, the increase and decrease of the currents need to be minimized. Accordingly, only in the case where the operating condition is the condition 1, the amplitudes of the duty ratios which are given for AC impedance measurement are made larger than other operating conditions, thereby appropriately carrying out the impedance measurement with suppressing battery deterioration.

Figure 1:
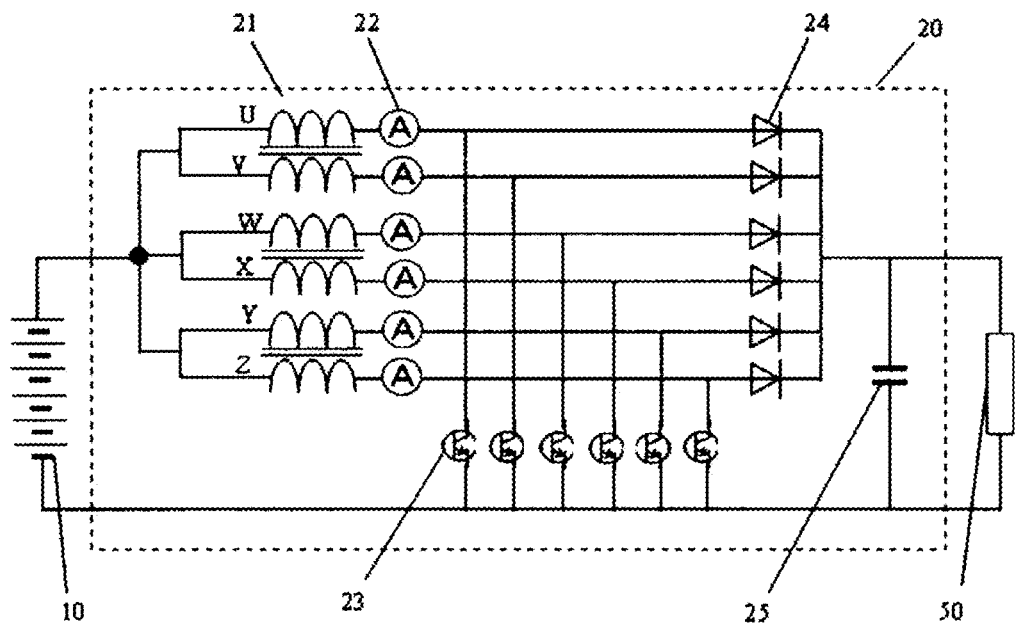
FIG. 1 is a diagram showing an example of the configuration of the circuit of a fuel cell system including a step-up converter and peripheral devices.

FIG. 1 is a diagram showing an example of the configuration of the circuit of a fuel cell system including a step-up converter and peripheral devices.

The fuel cell system shown in FIG. 1 is installed in a vehicle, for example. As an external load 50, a vehicle drive motor is connected through an inverter. The fuel cell system may include a battery (not shown) in parallel with a fuel cell 10 and a step-up converter 20. The output power of the fuel cell 10 is stepped up by the step-up converter 20, converted from DC to AC by the inverter, and then supplied to the motor.

The step-up converter 20 includes the step-up circuits of 6 phases, which are connected in parallel with each other. FIG. shows a configuration including the step-up circuits of 6 phases. However, the number of the phases is not particularly limited.

Each of the step-up circuits includes a reactor 21, a current sensor 22, a switch 23, a diode 24, and a capacitor 25. Each step-up circuit may include an input voltage sensor and an output voltage sensor. Of the step-up circuits of the 6 phases, every two phases can be magnetically coupled to each other by sharing the core of one reactor 21. In each step-up circuit, by turning the switch 23 ON, the current flowing through the reactor 21 increases. By turning the switch 23 OFF, the current flowing through the reactor 21 decreases. When the current reaches zero, the current is kept at zero. The current sensor 22 acquires the current value flowing through the reactor 21.

The controller controls ON and OFF of the switch 23, thereby controlling the step-up ratio at the converter 20 and the output current value from the fuel cell 10.

The output power of the fuel cell 10 largely changes depending on requests from the vehicle (such as speed, acceleration rate, load capacity and road gradient). As a result, the output current largely changes. When the output current of the fuel cell 10 is large, if the current is passed to one step-up circuit, heat generation increases to reduce power conversion efficiency. Even when a small current is passed through a step-up circuit resistant to a large current, an increase in loss occurs to reduce power conversion efficiency. Accordingly, the step-up converter 20 includes the step-up circuits of several phases (6 phases in FIG. 1) and depending on the output current value of the fuel cell 10, the step-up converter 20 switches the number of the operated phases. For example, when the output current value of the fuel cell 10 is from 0 A to 150 A, two phases are operated. When the output current value of the fuel cell 10 is from 150 A to 300 A, 4 phases are operated. When the output current value of the fuel cell 10 is from 300 A to 600 A, 6 phases are operated. The efficiency of the step-up circuits varies depending on the flowing current, and by changing the number of the operated phases, the step-up circuits can be operated at optimal efficiency in each current range.

The fuel cell system includes the fuel cell and the converter.

The fuel cell may be a single unit fuel cell, or it may be a fuel cell stack composed of stacked unit fuel cells.

The converter carries out at least one of step-up and step-down of the output voltage of the fuel cell. The converter may be a step-up converter, a step-down converter, or a step-up/step-down converter.

The converter may be a DC/DC converter.

The converter comprises the reactor comprising the coils of the n phases (n is an integer of 2 or more), which are magnetically coupled to each other, the switches of the n phases, which are connected to the coils, and the controller. The converter may further include a diode, a current sensor, a photocoupler, a capacitor and so on.

The reactor includes the coils and the core.

The coils of the n phases (n is an integer of 2 or more) may be wound around the core. As described above, "n" may be 2 or more, and the upper limit is not particularly limited. The upper limit may be 10 or less, 5 or less, 4 or less, or 3 or less.

The core and coils of the reactor may be employed from cores and coils used in conventionally-known converters.

In the disclosed embodiments, a reactor including a core and one independent coil wound around the core, is referred to as a non-magnetically coupled reactor; a converter including the non-magnetically coupled reactor is referred to as a non-magnetically coupled converter; a reactor including a core and two or more independent coils wound around the core, is referred to as a magnetically coupled reactor; and a converter including the magnetically coupled reactor is referred to as a magnetically coupled converter.

In the disclosed embodiments, the independent coil means a coil including one or more windings and two terminals.

The switch (switching element) may be an IGBT, a MOSFET or the like.

The diode may be employed from diodes used in conventionally-known converters.

The current sensor is not particularly limited, as long as it can acquire the current values flowing through the coils of the reactor (hereinafter, it may be referred to as "reactor current"). As the current sensor, a conventionally-known current meter or the like may be used.

The controller may be an electronic control unit (ECU) or the like. The ECU includes a central processing unit (CPU), a memory, and an input/output buffer.

By a signal from the current sensor, the controller may detect the current values flowing through the coils of the n phases of the reactor, and the controller may monitor the current values of the coils.

The controller controls ON and OFF of the switches of the n phases. The controller may operate the switches of the magnetically coupled n phases at a certain frequency.

By periodically switching an ON command and an OFF command to the switches, the controller carries out ON-OFF control of the switches. The output current value from the fuel cell may be controlled thereby.

In the present disclosure, the switching period means the period of time between when the switches switch from OFF to ON and when the switches switch from OFF to ON again.

The controller operates the switches of the n phases at different phases. The controller may operate the switches of the n phases at the same duty ratio. The controller may operate the switches of the n phases at slightly different phases.

The controller may operate the switches of the n phases at a phase difference of (360/n°).

When the controller determines that the following condition 1 is met, the controller makes the amplitudes which increase and decrease the duty ratios large compared to other operating conditions:

Condition 1: the operating condition in which, when the switches of the n phases are operated at different phases, and when the currents flowing through the coils are in the discontinuous mode and the current value flowing through the coil of one of the n phases is kept at zero, the switch connected to the coil of at least one of the remaining phases is switched from ON to OFF.

[Description of the Dead Zone]

The dead zone means a region where the average current values flowing through the coils of the reactor are nearly unchanged when the PWM duty ratio of the converter is increased and decreased. In the case of a two-phase magnetically coupled unidirectional step-up (step-down) circuit, due to the negative current generated by the mutual inductance of magnetic coupling, the dead zone appears in a part of the discontinuous mode region where the duty ratios are 50% or less (D≤0.5).

FIG. 2 is a graph of a change in the average current value flowing through each of the coils of the reactor (the average single phase current value) when the magnetically coupled coils of two phases are operated at an input voltage (Vfc) of 200 V, an output voltage (Vh) of 350 V and a constant step-up ratio, and the duty ratio is gradually increased. In FIG. 2, the self-inductance of the coils is 96.4 μH; the mutual inductance of the coils was 62.7 μH; and the operation frequency of the switches is 20 kHz.

According to the equation for calculating the average current values flowing through the coils of the reactor, which will be described later, as indicated by a dashed line shown in FIG. 2, the average current values flowing through the coils of the reactor are supposed to monotonically increase as the duty ratio increases. In fact, as indicated by a solid line, the average current values flowing through the coils increase in a stepwise manner, and in the areas surrounded by dotted lines, there is the dead zone in which the average current values flowing through the coils of the reactor do not change even when the duty ratios are increased. When the average current values flowing through the coils of the reactor are present in the dead zone, even when the duty ratios are changed, the average current values flowing through the coils of the reactor, that is, the output current value of the fuel cell do not change, and the AC impedance of the fuel cell cannot be appropriately measured.

Figure 3:
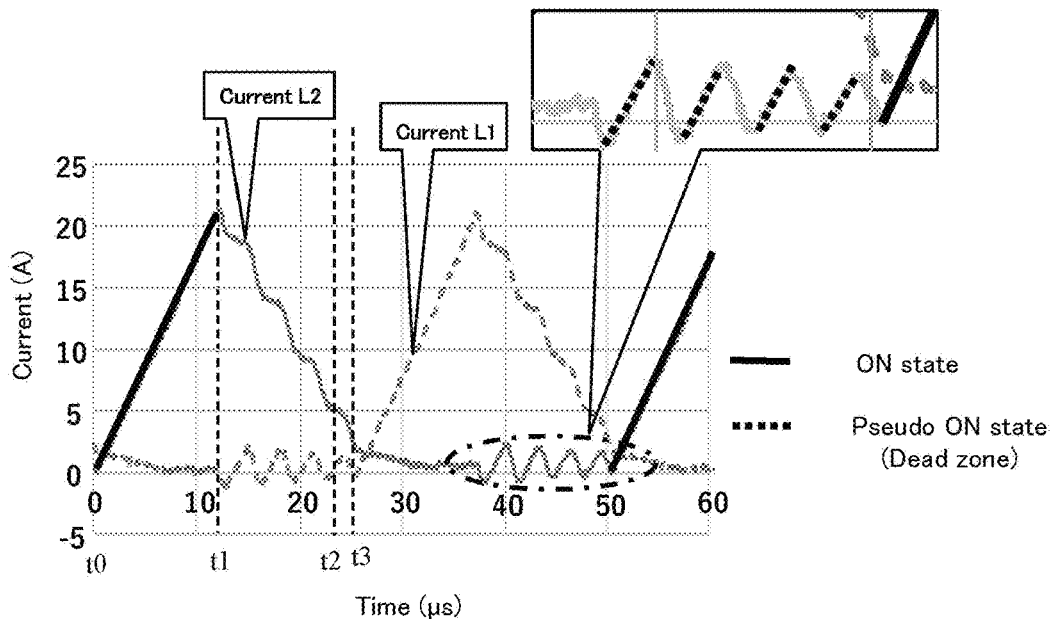
FIG. 3 is a graph showing the current waveforms of the magnetically coupled coils of two phases in a region where a dead zone occurs.

FIG. 3 is a graph showing the current waveforms of the magnetically coupled coils of two phases in the region where the dead zone occurs. In FIG. 3, L1 is the current of phase U, and L2 is the current of phase V.

During the period of time from t0 to t1, the switch of the phase V is ON, and the current L2 gradually increases. On the other hand, the switch of the phase U is OFF, and the current L1 is kept at 0. Since the switch of the phase V is switched from ON to OFF at the time t1, the current L2 of the phase V starts to decrease. At this time, the switch of the phase U is kept OFF; however, after the time t1, the L1 current flowing through the phase U by the interaction of phase V alternately decreases and increases.

Even if the switch of the phase U is turned ON when, like the time t2, the current L1 of the phase U is increasing, the switch ON signal is not recognized since the current has already increased. Then, the switch ON signal of the phase U is first recognized at the timing when, like the time t3, the current L1 of the phase U decreases. Then, the current L1 increases until the switch of the phase U is turned OFF. Since the timing when the switch ON signal is not recognized and the timing when the switch ON signal is recognized appear alternately, as shown in FIG. 2, the dead zone appears repeatedly.

As described above, if the switch of one of the magnetically coupled phases is switched from ON to OFF when the current value of the other phase is 0, there is an increase and decrease in the current flowing through the coil of the other phase. As a result, the dead zone appears.

Accordingly, it can be said that the dead zone appears in the following operating condition: as described in the condition 1, when the switches of the n phases are operated at different phases, when the currents flowing through the coils are in the discontinuous mode and the current value of the coil of one of the magnetically coupled phases is kept at 0, and when the switch of the other phase is switched from ON to OFF, the dead zone appears.

Figure 4:
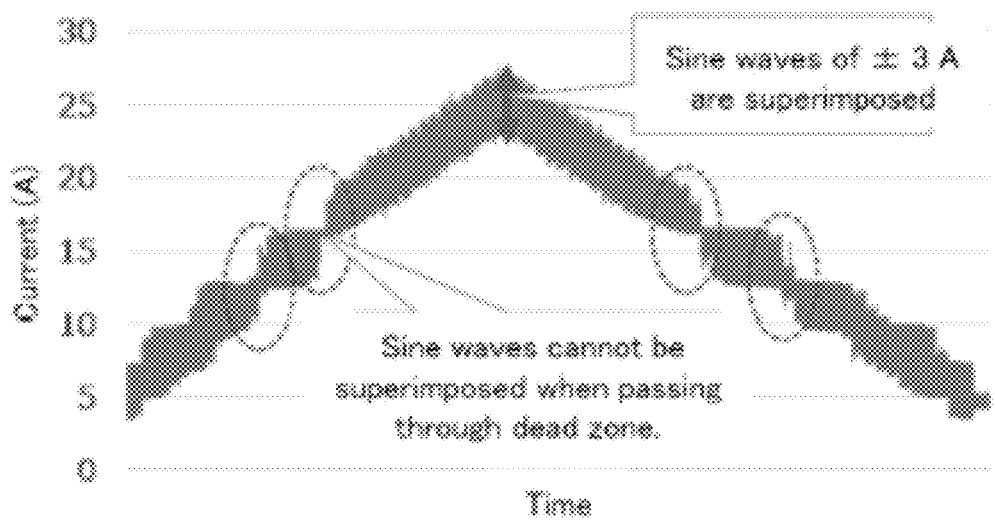
FIG. 4 is a graph of current waveforms when the magnetically coupled coils of two phases are operated, when a 270 Hz sine wave with an amplitude of ±3 A is superimposed on each of the phases, and when DC load current is swept in a range of from 5 A to 25 A.

FIG. 4 is a graph of current waveforms when the magnetically coupled coils of two phases are operated, when a 270 Hz sine wave with an amplitude of ±3 A is superimposed on each of the phases, and when DC load current is swept in a range of from 5 A to 25 A. In FIG. 4, as with FIG. 2, the step-up ratio is kept constant at an input voltage (Vfc) of 200 V and an output voltage (Vh) of 350 V; the self-inductance of the coils is 96.4 μH; the mutual inductance of the coils is 62.7 μH; and the operation frequency of the switches is 20 kHz. In the case of FIG. 4, since the relationship between the duty ratios and the average current values flowing through the coils of the reactor is thought to follow the dashed line shown in FIG. 2, the duty ratios are increased and decreased along the dashed line. However, as described above, the current values actually change in a stepwise manner, like the solid line shown in FIG. 2. Accordingly, the currents do not change even when the duty ratios are increased and decreased in the dead zones surrounded by the dotted lines in FIG. 2. As indicated by the dotted lines in FIG. 4, there are regions where a sine wave cannot be superimposed on the currents, and the AC impedance of the fuel cell cannot be measured in the regions. If a rapid change in DC load occurs in the specified regions surrounded by the dotted lines in FIG. 4, there is a possibility that the output response of the fuel cell is delayed, and a load applied to the battery and so on is increased.

In consideration of FIG. 4, when the duty ratios of the switches of the n phases are increased and decreased so that the amplitudes of the current values of the coils become normal amplitudes, and when the thus-measured amplitudes of the current values of the coils are smaller than an expected value, the controller may determine that the condition 1 is met. When the amplitudes of the current values of the coils are smaller than the expected value, the controller may determine that it corresponds to the state of not superimposing a sine wave and the measured current values of the coils have entered the dead zone.

Figure 5:
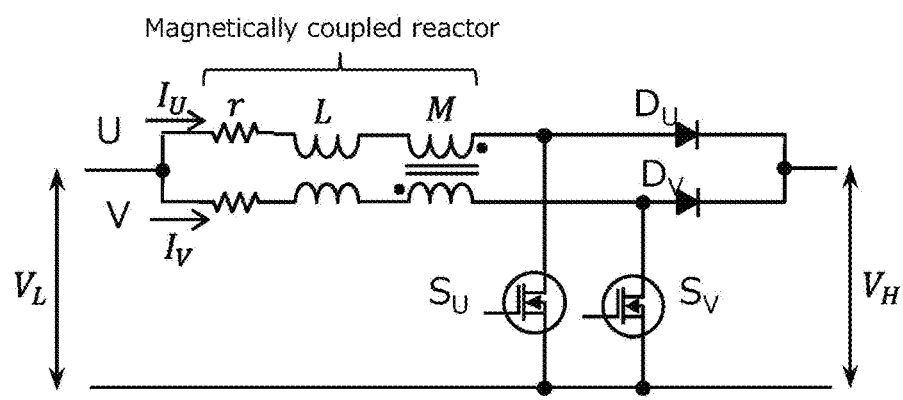
FIG. 5 is a diagram showing an example of a two-phase (phase U and phase V) magnetically coupled step-up circuit.

FIG. 5 is a diagram showing an example of a two-phase (phase U and phase V) magnetically coupled step-up circuit. In FIG. 5, $V_L$ is the input voltage (the voltage before step-up); $I_L$ is the input current; $V_H$ is the output voltage (the voltage after step-up): $I_H$ is the output current; D is the diode: S is the switch; M is the mutual inductance; L is the self-inductance; and r is internal resistance.

The following equation (1) is the equation of the state of the vector of the current I. By solving the equation, the current curve indicated by the dashed line shown in FIG. 2 is obtained. The vector of the voltage V of the equation (1) is expressed as shown in Table 1. Table 1 shows the vector of the voltage V of the equation (1) and the dead zone occurrence condition (areas marked with diagonal lines).

Due to the negative current generated by the mutual inductance (expressed by "M" in FIG. 5 and the equation (1)) of magnetic coupling, in the two-phase magnetically coupled unidirectional step-up (step-down) circuit, as indicated by the areas marked with the diagonal lines shown in Table 1, the dead zone appears in a part of the discontinuous mode region where the switches of both of the phases are in the OFF state, that is, the switches are operated at a phase difference of 180° and the duty ratios are less than 50% (D<0.5). The mechanism for the occurrence of the dead zone can be obtained by solving the equation (1) along the timeline in the condition shown in Table 1. More specifically, when the switches of both of the phases are in the OFF state and when the current flowing through one of the coils is 0 A and the current flowing through the other coil is positive, electromotive voltage is generated by mutual inductance in the 0 A-side coil, thereby generating a negative current. Then, as the negative current increases, the electromotive force of the coil is lost, and the negative current decreases. However, during the period of time taken to return the current flowing through the 0 A-side coil to 0 A, like the areas marked with the diagonal lines in Table 1, the switches are in the pseudo ON state. Accordingly, even when the negative current-side switch is ON or OFF, no influence can be made on the current wavelength, and the dead zone occurs.

For example, in the case of a three-phase (U, V and W) magnetically coupled step-up circuit, the dead zone occurs in the following condition: the dead zone occurs when the switches of all of the three phases are OFF and when $I_U>0$, $I_V\leq0$ and $I_W\leq0$, or the dead zone occurs when the switches of all of the three phases are OFF and when $I_U>0$, $I_V>0$ and $I_W\geq0$.

$$\vec{i} = \frac{1}{(L^2 - M^2)}\begin{pmatrix} L & M \\ M & L \end{pmatrix}(\vec{V} - r\vec{i}) \qquad (1)$$

TABLE 1

| V vector | Phase U ON | Phase U OFF $I_U > 0$ | Phase U OFF $I_U \leq 0$ |
|---|---|---|---|
| Phase V ON | $\vec{V} \equiv \begin{pmatrix} V_L \\ V_L \end{pmatrix}$ | | $\vec{V} \equiv \begin{pmatrix} V_L - V_H \\ V_L \end{pmatrix}$ |
| Phase V OFF $I_U > 0$ | $\vec{V} \equiv \begin{pmatrix} V_L \\ V_L - V_H \end{pmatrix}$ | $\vec{V} \equiv \begin{pmatrix} V_L - V_H \\ V_L - V_H \end{pmatrix}$ | |
| Phase V OFF $I_V \leq 0$ | | | $\vec{V} \equiv \begin{pmatrix} V_L \\ V_L \end{pmatrix}$ |

Figure 6:
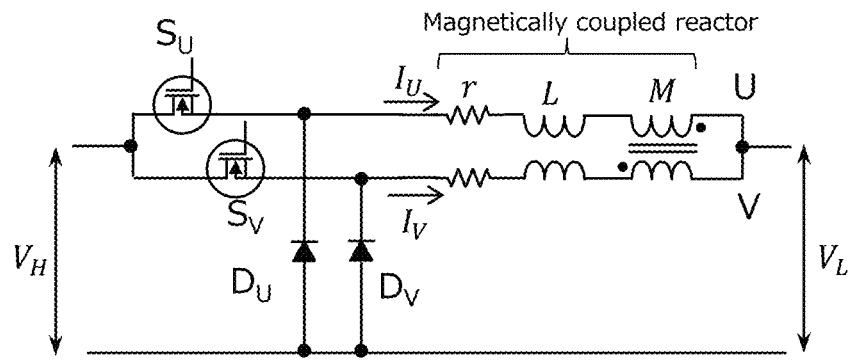
FIG. 6 is a diagram showing an example of a two-phase (phase U and phase V) magnetically coupled step-down circuit.

FIG. 6 is a diagram showing an example of a two-phase (phase U and phase V) magnetically coupled step-down circuit.

Figure 7:
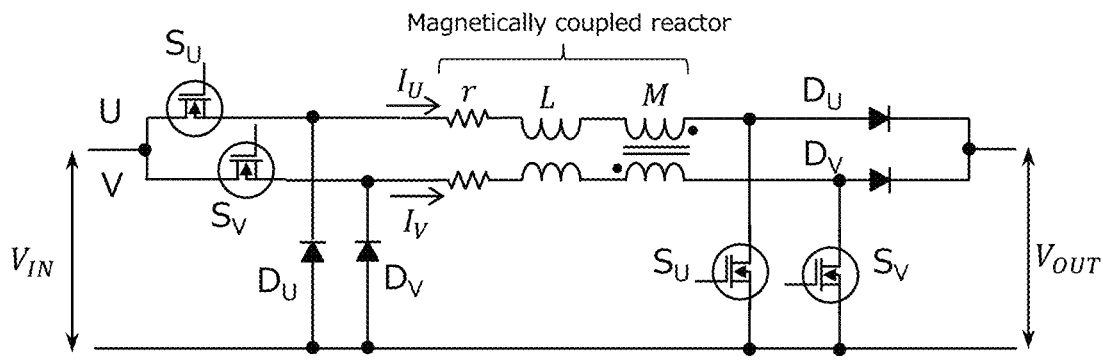
FIG. 7 is a diagram showing an example of a two-phase (phase U and phase V) magnetically coupled step-up/step-down circuit.

FIG. 7 is a diagram showing an example of a two-phase (phase U and phase V) magnetically coupled step-up/step-down circuit.

In addition to the step-up circuit, the step-down circuit and the step-up/step-down circuit have the current control dead zone problem, and the AC impedance of the fuel cell can be appropriately measured by, in the operating condition of the condition 1 in which the dead zone occurs, making the amplitudes which increase and decrease the duty ratios large compared to other operating conditions. It is thought that there is no dead zone in a two-way circuit which does not have a discontinuous mode.

[Description of Continuous Mode and Discontinuous Mode]

Figure 8:
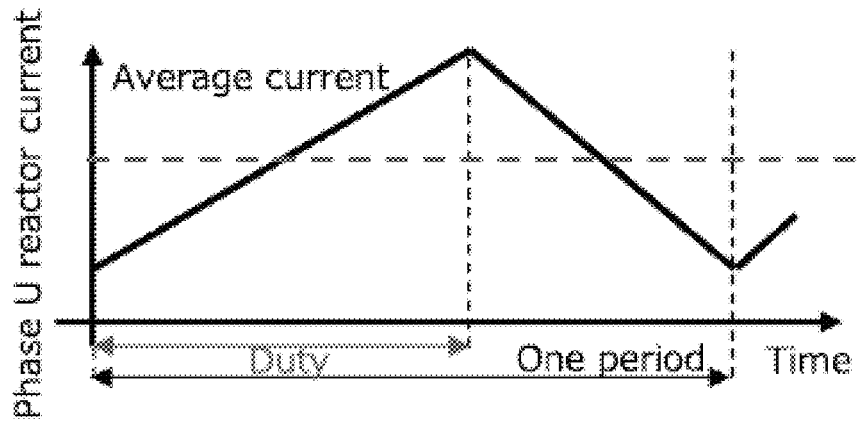
FIG. 8 is a graph of an example of a current waveform when a current flowing through the coil of the reactor of phase U of a step-up converter, is in a continuous mode.

FIG. 8 is a graph of an example of a current waveform when a current flowing through the coil of the reactor of phase U of a step-up converter, is in a continuous mode.

Figure 9:
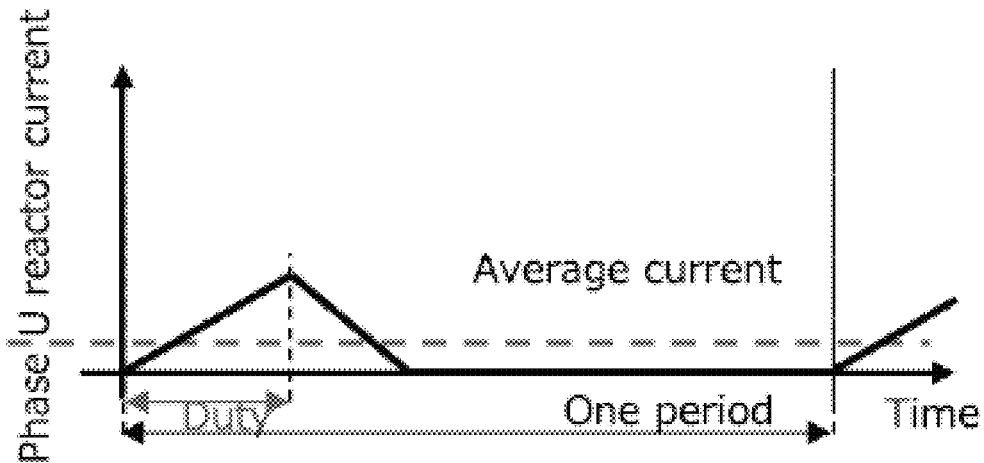
FIG. 9 is a graph of an example of a current waveform when a current flowing through the coil of the reactor of phase U of a step-up converter, is in a discontinuous mode.

FIG. 9 is a graph of an example of a current waveform when a current flowing through the coil of the reactor of phase U of a step-up converter, is in a discontinuous mode.

As shown in FIG. 8, along with switching operation, the current flowing through the coil of the reactor of the phase U of the step-up converter (i.e., the reactor current) become a triangle wave, and the median value of the triangle wave is the average reactor current (hereinafter, it will be referred to as "average current"). When the average current is decreased by decreasing the duty ratio, the lowest point of the triangle wave reaches 0 A. When the average current is further decreased, since the step-up converter is a one-way circuit, as shown in FIG. 9, the period of time in which the reactor current is zero, starts to occur. As just described, the operation including the period of time in which the current flowing through the coil of the reactor of the converter reaches zero, is referred to as the discontinuous mode, and the operation not including the period of time in which the current flowing through the coil of the reactor reaches zero, is referred to as the continuous mode.

In consideration of different cases depending on conditions, the controller may preliminarily store the data group showing the relationship between the inlet voltage (input voltage) of the converter, the outlet voltage (output voltage) of the converter, the duty ratios of the switches and the current values of the coils, and when the controller determines that the condition 1 is met, the controller may refer to the data group and make the amplitudes which increase and decrease the duty ratios of the switches of the n phases, large compared to other operating conditions.

Figure 10:
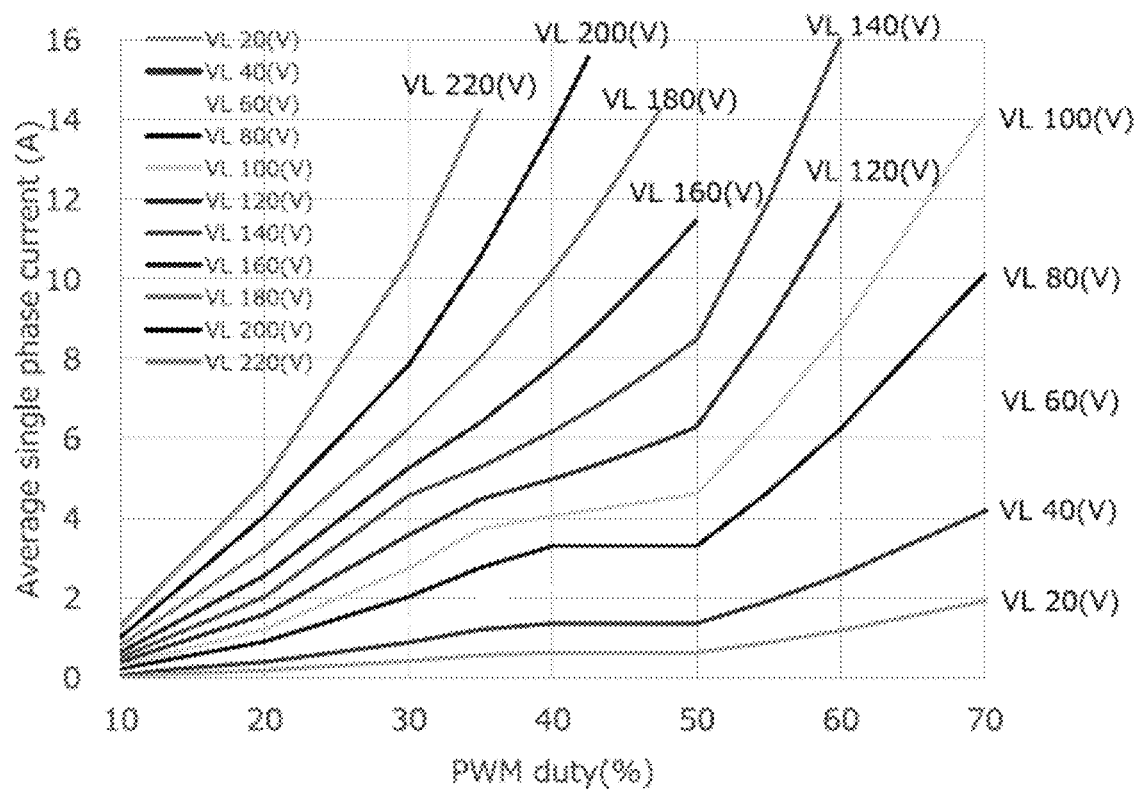
FIG. 10 is a graph showing an example of the relationship between the average single phase current values flowing through the coils of the reactor of a magnetically coupled converter and the duty ratios of the switches of the magnetically coupled converter.

FIG. 10 is a graph showing an example of the relationship between the average single phase current values flowing through the coils of the reactor of a magnetically coupled converter and the duty ratios of the switches of the magnetically coupled converter.

When the output voltage ($V_H$) of the converter is kept constant,
the average current value flowing through the coils of the reactor depending on the input voltage ($V_L$) into the converter and the duty ratios is fixed. In general, when the duty ratios are increased, the average current value flowing through the coils of the reactor increases.

The controller may include the map (data group) storing the properties as shown in FIG. 10, and when measuring the AC impedance of the fuel cell, the controller may increase and decrease the duty ratios so that the average current value of the coils flowing through the reactor is increased and decreased with the predetermined amplitude. The amplitudes of the duty ratios may be determined considering the slopes of the graphs shown in FIG. 10. In the present disclosure, the duty ratios may be increased and decreased with a large amplitude so that, in the operating condition of the condition 1 in which the dead zone occurs, the amplitudes of the currents become larger than other operating conditions. For example, if it is determined that the condition 1 is not met when the input voltage ($V_L$) into the converter is 20 V and the average current value of the coils flowing through the reactor is 9 A, the duty ratios may be increased and decreased in a range of from 23% to 33% (D=0.23 to 0.33) so that, when measuring the AC impedance of the fuel cell, the amplitudes of the currents are about ±3 A, that is, the current values of the coils increase and decrease between 6 A and 12 A. On the other hand, in the operating condition of the condition 1 in which the dead zone occurs, the duty ratios may be increased and decreased in a range of from 14% to 38% (D=0.14 to 0.38) so that the amplitudes of the currents are about ±5 A, that is, the current values of the coils increase and decrease between 4 A and 14 A. As shown in FIG. 10, the slopes of the graphs between the duty ratios and the current values of the coils vary depending on operating conditions. Accordingly, with selecting appropriate amplitudes of the duty ratios with reference to FIG. 10, a sine wave is superimposed on the currents flowing through the coils.

Figure 11:
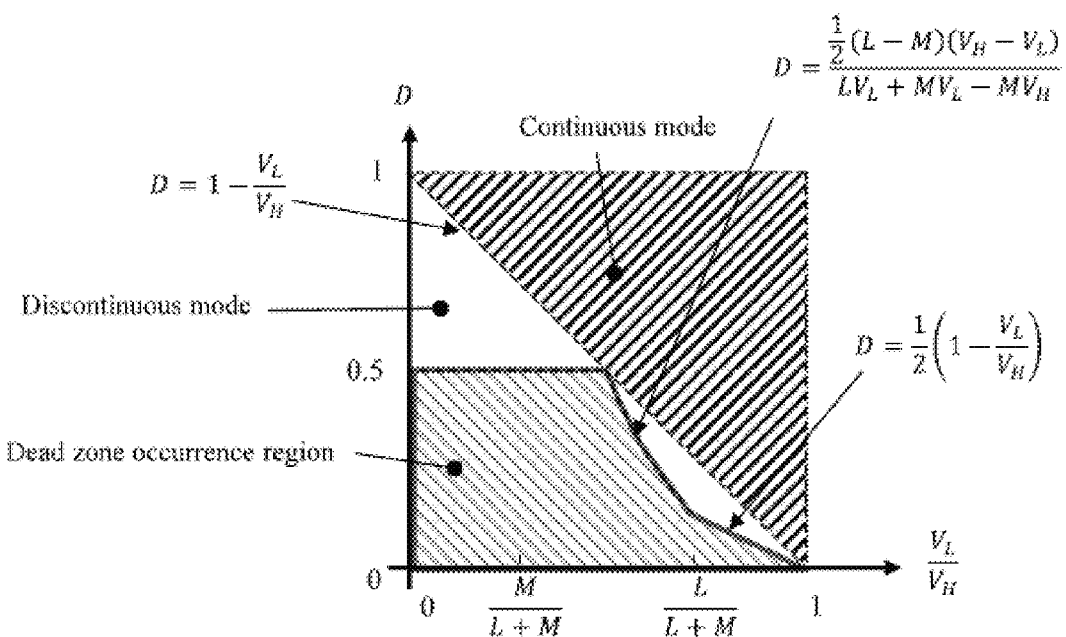
FIG. 11 is a diagram showing the dead zone occurrence region in a discontinuous mode.

FIG. 11 is a diagram showing a dead zone occurrence region in a discontinuous mode.

For a step-up converter in which (every) two phases are magnetically coupled and L is larger than M (L>M), it was found that the region where the condition 1 is met and the dead zone occurs, is a region which is marked with diagonal lines as the dead zone occurrence region.

L is the self-inductance of the reactor, and M is the mutual inductance of the reactor. They are inherent values determined by the physical values of the reactor. $V_L$ is the inlet voltage of the step-up converter (the voltage before step-up), and $V_H$ is the outlet voltage (the voltage after step-up) of the step-up converter.

When two phases are magnetically coupled (n=2), the two phases may be operated at different phases, and they may be operated at a phase difference of 180°. When the two phases are operated at different phases, as long as the currents are in the discontinuous mode and the duty ratios are less than 50% (D<0.5), the step-up converter operating condition becomes the operating condition in which when the average current value of the coil of one of the magnetically coupled phases is kept at 0, the switch of the other phase is switched from ON to OFF.

From the viewpoint of accurately determining the operating condition in which the dead zone occurs, when two phases are magnetically coupled (n=2), the controller may determine that the condition 1 is met, when it determines that the following condition of the dead zone occurrence region shown in FIG. 11 is met:

The condition 1 is met when the switches of the two magnetically coupled phases are operated at a phase difference of 180°, and when the currents flowing through the coils are in the discontinuous mode and the duty ratios (D) of the switches of the two phases are less than 50% (D<0.5) and satisfy any one of the following formulae (A) and (B):

$$D<\{(1/2)(L-M)(V_H-V_L)\}/(LV_L+MV_L-MV_H) \qquad \text{Formula (A)}$$

$$D<(1/2)\{1-(V_L/V_H)\} \qquad \text{Formula (B)}$$

where L is the self-inductance of the reactor; M is the mutual inductance of the reactor; $V_H$ is the outlet voltage of the converter; $V_L$ is the inlet voltage of the converter; and D is the duty ratio (-).

When (every) two phases are magnetically coupled, a part of the condition 1 is that "when the switches of the two magnetically coupled phases are operated at a phase difference of 180°, the currents flowing through the coils are in the discontinuous mode and the duty ratios of the switches of the two phases are less than 50% (D<0.5)".

Meanwhile, when (every) n phases are magnetically coupled, and the n magnetically coupled phases are operated at a phase difference of (360/n°), the condition 1 is "when the switches of the n magnetically coupled phases are operated at a phase difference of (360/n°), the currents flowing through the coils are in the discontinuous mode and the duty ratios of the switches of the n phases are less than (100−100/n) %", in place of "when the switches of the two magnetically coupled phases are operated at a phase difference of 180°, the currents flowing through the coils are in the discontinuous mode and the duty ratios of the switches of the two phases are less than 50% (D<0.5)".

[AC Impedance Measurement]

The controller operates the duty ratios of the switches of the n phases with periodically increasing and decreasing them, and the controller measures an AC impedance of the fuel cell from a current waveform of and a voltage waveform of the fuel cell.

The controller may confirm whether or not there is a request for AC impedance measurement of the fuel cell. Then, when the controller confirms that there is a request for AC impedance measurement of the fuel cell, the controller may determine whether or not the condition 1 is met. The control can be simplified by, only when there is a request for AC impedance measurement of the fuel cell, determining whether or not the condition 1 is met.

On the other hand, when the controller determines that the condition 1 is met, the controller may confirm whether or not there is a request for AC impedance measurement of the fuel cell. Then, when the controller confirms that there is a request for AC impedance measurement of the fuel cell, the controller may make the amplitudes which increase and decrease the duty ratios of the switches of the n phases, large compared to other operating conditions, and the controller may measure the AC impedance of the fuel cell. The control is simplified by, only when the condition 1 is met, determining whether or not there is a request for AC impedance measurement of the fuel cell.

To perceive the state of the electrolyte membrane of the fuel cell and the condition of gas supply, the controller measures the AC impedance of the fuel cell at a predetermined frequency during the operation of the fuel cell.

The controller switches the PWM duty ratios of the converter, while it periodically increases and decreases the PWM duty ratios; the output voltage and output current value of the fuel cell when a load current containing a certain frequency component is applied, are acquired as time-series waveform data of one wavelength or more; the waveform data is subjected to the discrete Fourier transform; and the discrete Fourier transform result of the voltage signal is divided by the discrete Fourier transform result of the current signal, thereby calculating the AC impedance of the fuel cell.

In the low load region referred to as the "discontinuous mode", as the duty ratios increase, the average current values flowing through the coils of the reactor also increases.

To acquire the AC impedance of the fuel cell, the duty ratios may be controlled so that the amplitude of the output current becomes a sine wave of about ±3 A.

As the output voltage value of the fuel cell, the voltage of the whole fuel cell stack may be acquired, or the voltage of each unit cell may be acquired. By use of the voltage value of the whole fuel cell stack, the AC impedance of the whole fuel cell stack is obtained. By use of the voltage value of each unit cell, the AC impedance of each unit cell is obtained.

By acquiring the voltage of every few unit cells (such as every two unit cells and every four unit cells), the AC impedance of every unit cell block is acquired.

When the unit cell area is approximately several hundreds of cm$^2$, the component of 200 Hz or more of the AC impedance acquired during power generation, mainly represents the proton transfer resistance and contact resistance of the electrolyte membrane, and a component of several tens of Hz represents gas diffusion resistance.

In the disclosed embodiments, the method for measuring the AC impedance of the fuel cell is not particularly limited. A commonly-known method may be used, such as the method described in JP-A No. 2008-098134.

Typical Example

Figure 12:
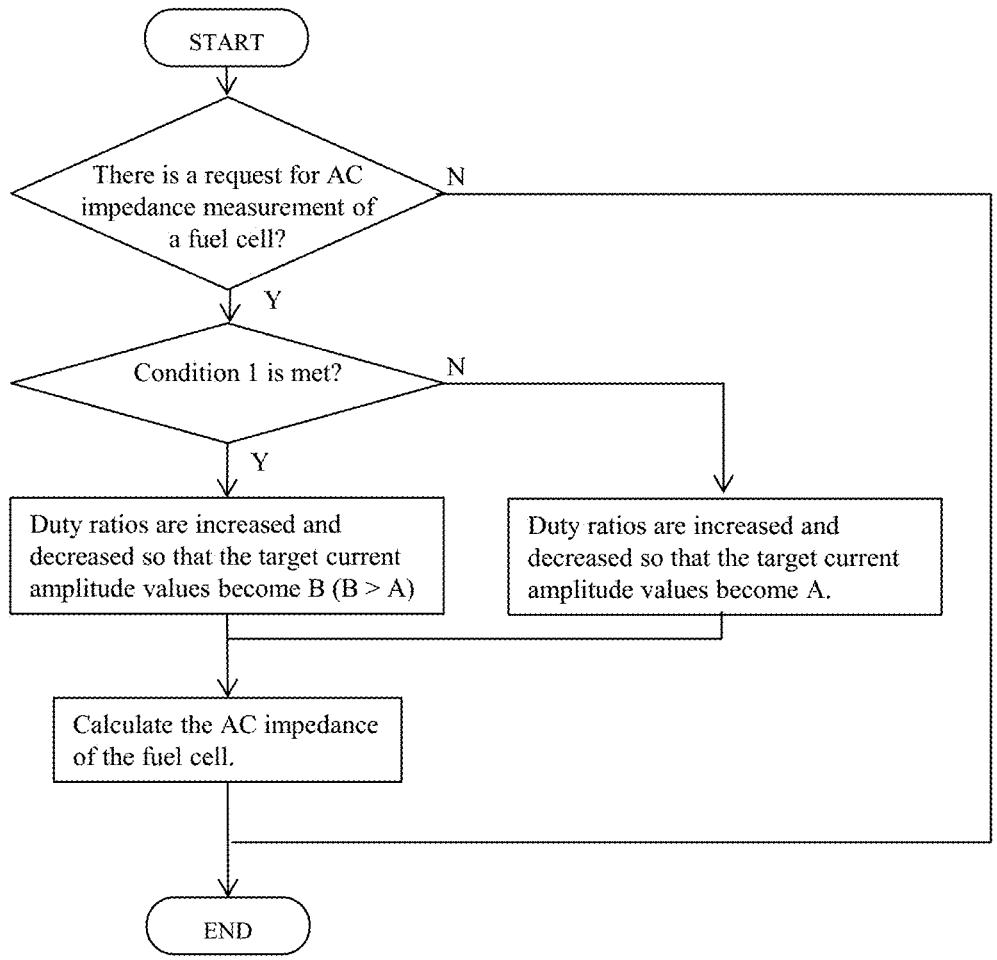
FIG. 12 is a flowchart of an example of control when AC impedance measurement of a fuel cell is carried out in a fuel cell system including a converter that includes an n-phase magnetically coupled reactor.

FIG. 12 is a flowchart of an example of control when AC impedance measurement of the fuel cell is carried out in the fuel cell system including the converter that includes the n-phase magnetically coupled reactor.

The controller determines whether or not there is a request for AC impedance measurement of the fuel cell. When the controller determines that there is no request for AC impedance measurement of the fuel cell, the controller may end the control or may maintain the present amplitudes which increase and decrease the duty ratios. On the other hand, when the controller determines that there is a request for AC impedance measurement of the fuel cell, the controller monitors the current values of the coils, and the controller determines whether or not the following condition as the condition 1 is met: "the operating condition in which, when the switches of the n phases are operated at different phases, and when the currents flowing through the coils are in the discontinuous mode and the current value flowing through the coil of one of the n phases is kept at zero, the switch connected to the coil of at least one of the remaining phases is switched from ON to OFF". When the controller determines that the condition 1 is not met, the controller measures the AC impedance of the fuel cell, with maintaining the present amplitudes which increase and decrease the duty ratios. On the other hand, when the controller determines that the condition 1 is met, the controller makes the amplitudes which increase and decrease the duty ratios of the switches of the n phases, large compared to the present operating condition, and the controller measures the AC impedance of the fuel cell. For example, in the case where the present operating condition increases and decreases the duty ratios so that the target current amplitude values become A, if the controller determines that the condition 1 is met, the controller may make the amplitudes which increase and decrease the duty ratios large compared to the present operating condition so that the target current amplitude values become B which is larger than A (B>A). The target current amplitudes to be changed may be set depending on the duty ratio D, the inlet voltage $V_L$ and the outlet voltage $V_H$.

Specific Examples

When two phases are magnetically coupled (n=2), the controller may determine that the condition 1 is met, when it determines that "when the switches of the two magnetically coupled phases are operated at a phase difference of 180°, the currents flowing through the coils are in the discontinuous mode and the duty ratios of the switches of the two phases are less than 50% (D<0.5) and satisfy any one of the formulae (A) and (B)".

Figure 13:
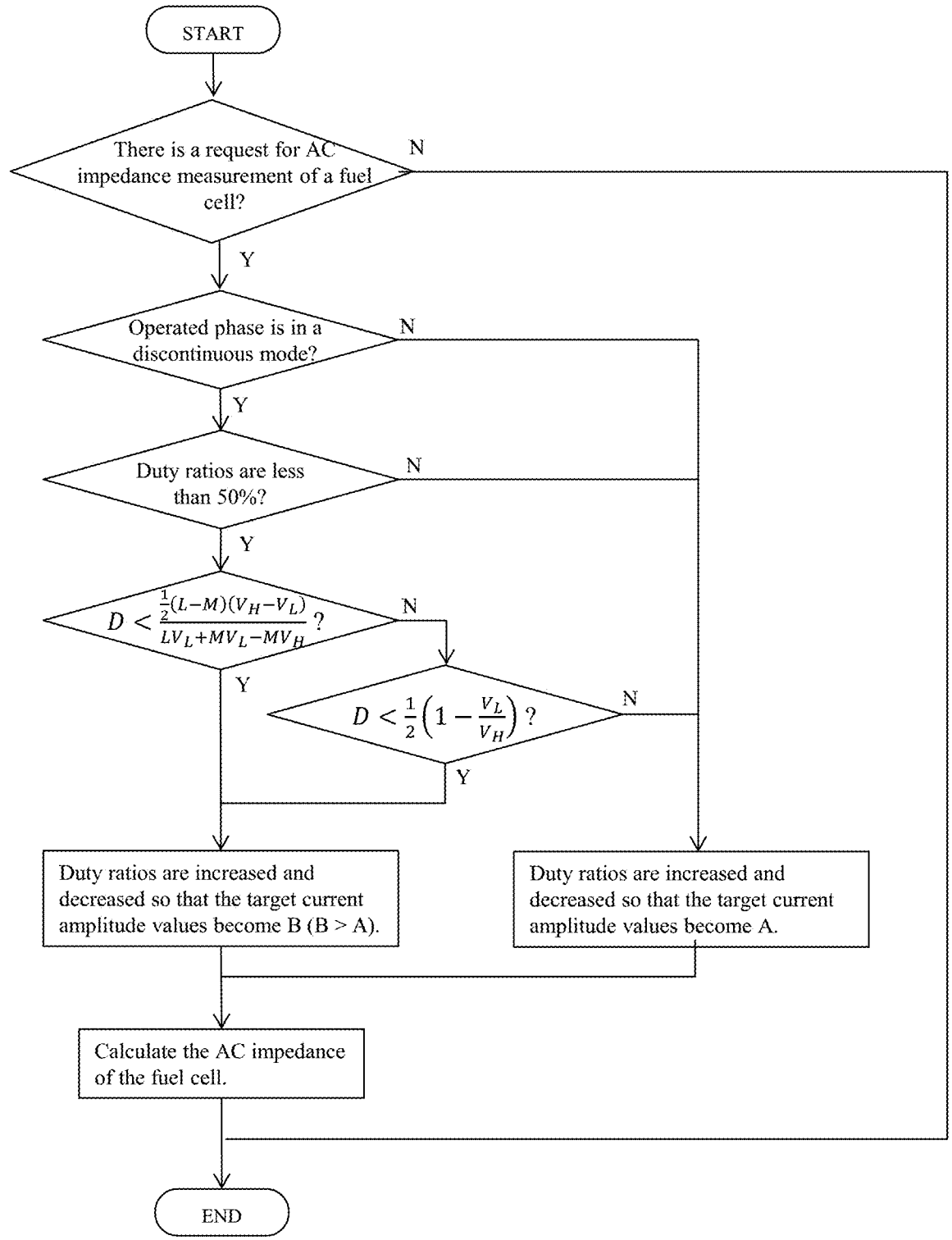
FIG. 13 is a flowchart of an example of control when AC impedance measurement of a fuel cell is carried out in a fuel cell system including a converter that includes a two-phase magnetically coupled reactor.

FIG. 13 is a flowchart of an example of control when AC impedance measurement of the fuel cell is carried out in the fuel cell system including the converter that includes the two-phase magnetically coupled reactor.

The controller determines whether or not there is a request for AC impedance measurement of the fuel cell. When the controller determines that there is no request for AC impedance measurement of the fuel cell, the controller may end the control or may maintain the present amplitudes which increase and decrease the duty ratios. On the other hand, when the controller determines that there is a request for AC impedance measurement of the fuel cell, the controller monitors the current values of the coils, and the controller determines whether or not the following condition as the condition 1 is met: "when the switches of the two magnetically coupled phases are operated at a phase difference of 180°, the currents flowing through the coils (the operated phases) are in the discontinuous mode and the duty ratios of the switches of the two phases are less than 50% (D<0.5) and satisfy any one of the formulae (A) and (B)". When the controller determines that the condition 1 is not met, the controller measures the AC impedance of the fuel cell with maintaining the present amplitudes which increase and decrease the duty ratios so that the target current amplitude values become A. On the other hand, when the controller determines that the condition 1 is met, the controller makes the amplitudes which increase and decrease the duty ratios of the switches of the two phases, large compared to the present operating condition so that the target current amplitude values become B (B>A), and the controller measures the AC impedance of the fuel cell.

In the example shown in FIG. 13, when the AC impedance of the fuel cell is measured in the state of entering the above-described dead zone occurrence region during the operation of the fuel cell system, the duty ratios may be increased and decreased so that, on the map of FIG. 10, the amplitudes of the current values are large compared to the case of measuring the AC impedance in other conditions. By setting the amplitude widths of the current values to a value equal to or larger than a difference in current step shown in FIG. 2, even in a region where the dead zone occurs, amplitudes are certainly imparted to the currents, and the AC impedance of the fuel cell can be measured.

As shown in FIG. 11, "the dead zone occurrence region" is the time such that "when the switches of the two magnetically coupled phases are operated at a phase difference of 180°, the currents flowing through the coils are in the discontinuous mode and the duty ratios of the switches of the two phases are less than 50% (D<0.5) and satisfy any one of the formulae (A) and (B)". Accordingly, for example, at the timing when the operating condition moves to the dead zone occurrence region shown in FIG. 11, the operation may be transferred from the operating mode in which the target current amplitudes are small to the operating mode in which the target current amplitudes are large.

When the condition that "when the switches of the two magnetically coupled phases are operated at a phase difference of 180°, the currents flowing through the coils are in the discontinuous mode and the duty ratios of the switches of the two phases are less than 50% (D<0.5)" is not met, the target current amplitudes are made small. Accordingly, the level of charge and discharge of the battery is decreased, and the shortening of the battery lifetime is suppressed.

The method for determining whether or not the dead zone occurrence condition 1 is met, is not limited to the above. For example, depending on the input voltage and duty ratio, the range corresponding to the dead zone is defined, and when it is shown that the input voltage and the duty ratio have entered or come close to the range corresponding to the dead zone, the controller may determine that the condition 1 is met.

As described above, the range corresponding to the dead zone is preliminarily defined. When the input voltage and the duty ratio enter the range, the amplitudes of the duty ratios are switched. Accordingly, the AC impedance of the fuel cell is immediately acquired when it is needed.

In FIG. 13, the condition 1 for making the target current amplitudes large, is defined as follows: "when the switches of the two magnetically coupled phases are operated at a phase difference of 180°, the currents flowing through the coils are in the discontinuous mode and the duty ratios of the switches of the two phases are less than 50% (D<0.5) and satisfy any one of the formulae (A) and (B)". However, the condition "the duty ratios of the switches of the two phases satisfy any one of the formulae (A) and (B)" may be excluded from the condition 1.

That is, the condition 1 may be as follows: "when the switches of the two magnetically coupled phases are operated at a phase difference of 180°, the currents flowing through the coils are in the discontinuous mode, and the duty ratios of the switches of the two phases are less than 50% (D<0.5)". In this case, for example, at the timing when the output requested to the fuel cell is decreased and when the condition moves from the condition in which the currents flowing through the coils are in the discontinuous mode and the duty ratios of the switches of the two phases are 50% or more (D≥0.5) to the condition in which the currents flowing through the coils are in the discontinuous mode and the duty ratios of the switches of the two phases are less than 50% (D<0.5), the amplitudes of the duty ratios of the switches of the two phases may be switched.

As shown in FIG. 11, the region excluded by the formulae (A) and (B) from the range in which the current amplitudes are made large, is not large. Accordingly, even when the condition "the duty ratios of the switches of the two phases satisfy any one of the formulae (A) and (B)" is excluded, it is thought that there is a limited influence on the increase of battery lifetime. Meanwhile, by excluding the condition "the duty ratios of the switches of the two phases satisfy any one of the formulae (A) and (B)", the control is simplified, and the AC impedance of the fuel cell is appropriately measured.

Another variation of the condition 1 may be as follows: "when the switches of the two magnetically coupled phases are operated at a phase difference of 180°, the currents flowing through the coils are in the discontinuous mode, and the duty ratios of the switches of the two phases are less than 50% (D<0.5) and satisfy the formula (A)" or "when the switches of the two magnetically coupled phases are operated at a phase difference of 180°, the currents flowing through the coils are in the discontinuous mode, and the duty ratios of the switches of the two phases are less than 50% (D<0.5) and satisfy the formula (B)".

Modified Example 1

As described above, when the duty ratios of the switches of the n phases are increased and decreased so that the amplitudes of the current values of the coils become normal amplitudes, and when the measured amplitudes of the current values of the coils are smaller than the expected value, the controller may determine that the condition 1 is met.

Figure 14:
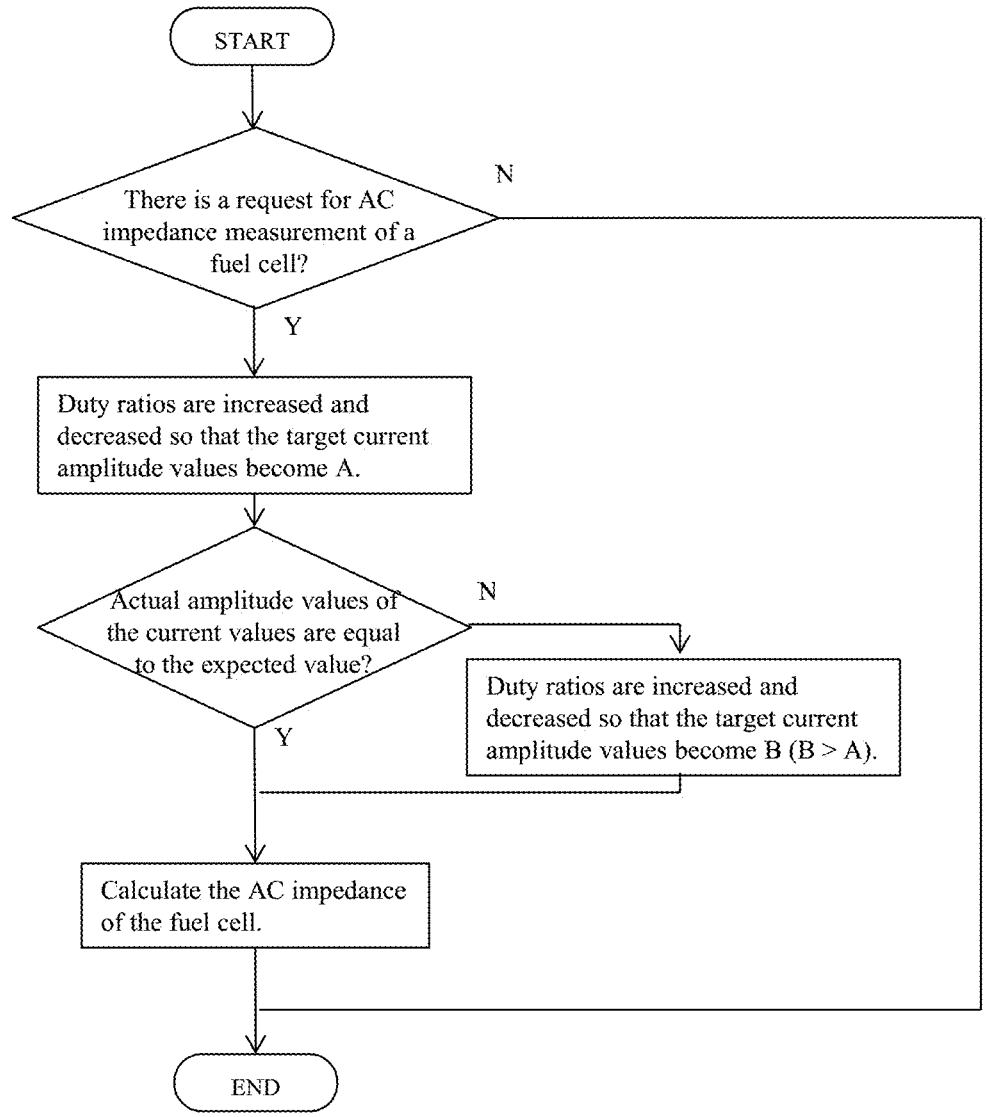
FIG. 14 is a flowchart of another example of control when AC impedance measurement of a fuel cell is carried out in a fuel cell system including a converter that includes an n-phase magnetically coupled reactor.

FIG. 14 is a flowchart of another example of control when AC impedance measurement of a fuel cell is carried out in a fuel cell system including a converter that includes an n-phase magnetically coupled reactor.

In FIG. 14, the controller determines whether or not there is a request for AC impedance measurement of the fuel cell. When the controller determines that there is no request for AC impedance measurement of the fuel cell, the controller may end the control or may maintain the present amplitudes which increase and decrease the duty ratios. On the other hand, when the controller determines that there is a request for AC impedance measurement of the fuel cell, the controller increases and decreases the duty ratios so that the amplitudes become the normal amplitudes of the current values (the target current amplitude values are A). Then, the controller determines whether or not the following condition as the condition 1 is met: "when the duty ratios of the switches of the n phases are increased and decreased so that the amplitudes of the current values of the coils become the normal amplitudes of the current values, the measured (actual) amplitudes of the current values of the coils are smaller than the expected value". When the measured amplitudes of the current values of the coils are smaller than the expected value, the controller makes the amplitudes which increase and decrease the duty ratios, large compared to the present operating condition so that the amplitudes of the current values of the coils become the target current amplitude value B (B>A), and the controller measures the AC impedance of the fuel cell. On the other hand, when the measured amplitudes of the current values of the coils are equal to the expected value, the controller measures the AC impedance of the fuel cell with maintaining the present amplitudes which increase and decrease the duty ratios.

In this case, the duty ratios are increased and decreased so that the amplitudes become the normal amplitudes of the current values. When the actual amplitudes of the current values are smaller than the expected value, the controller may determine that the currents flowing through the coils have entered the dead zone.

As described above, it is determined whether or not the currents flowing through the coils have entered the dead zone, based on the amplitudes of the actual current values. Accordingly, the duty ratios are appropriately switched, and the AC impedance of the fuel cell is acquired even when the region of the dead zone is shifted by a variation in products, for example.

Modified Example 2

The controller may determine whether or not the condition 1 is met, from current waveforms flowing through the coils just before the measurement of the AC impedance of the fuel cell.

Figure 15:
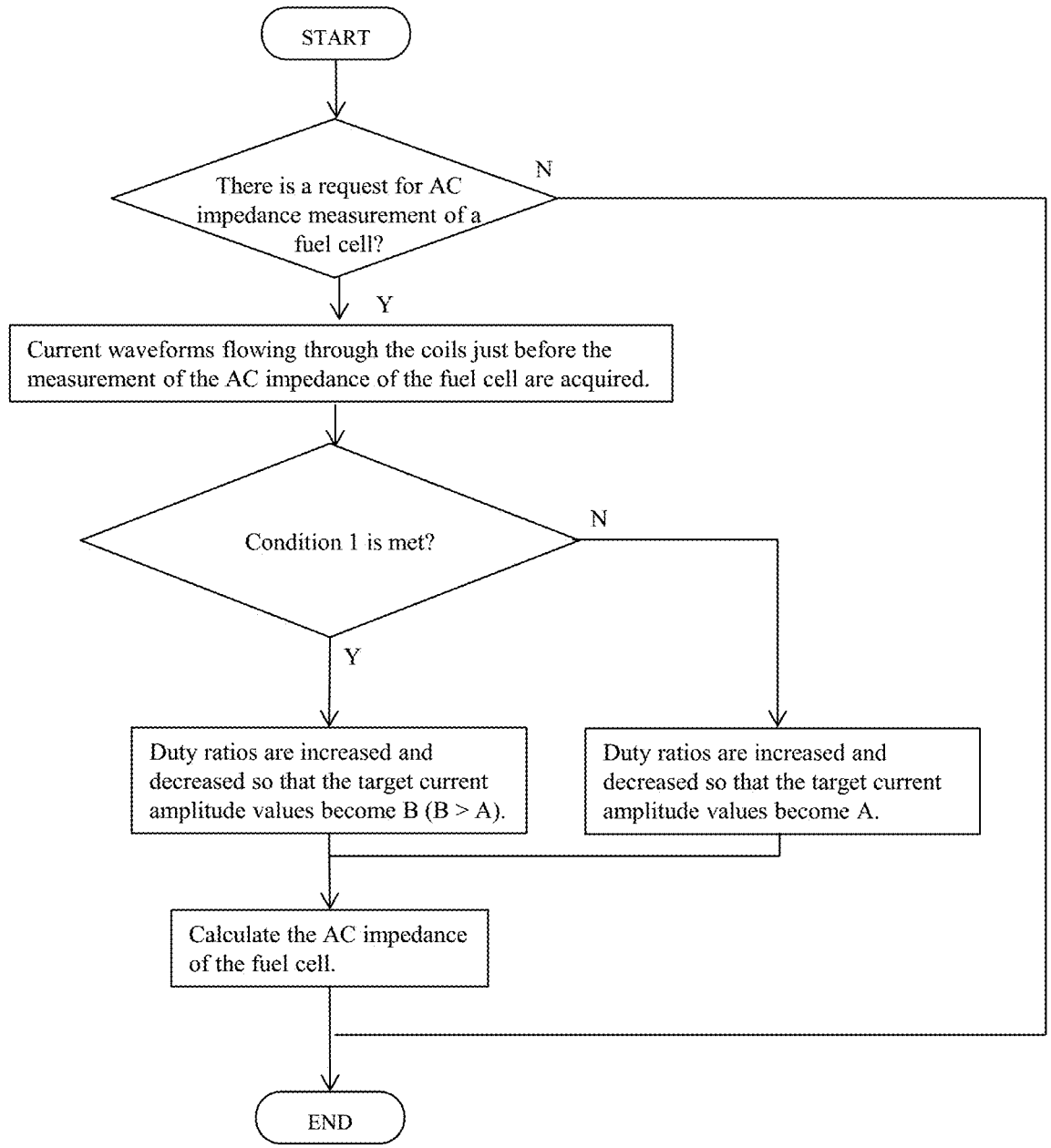
FIG. 15 is a flowchart of another example of control when AC impedance measurement of a fuel cell is carried out in a fuel cell system including a converter that includes an n-phase magnetically coupled reactor.

FIG. 15 is a flowchart of another example of control when AC impedance measurement of a fuel cell is carried out in a fuel cell system including a converter that includes an n-phase magnetically coupled reactor.

In FIG. 15, the controller determines whether or not there is a request for AC impedance measurement of the fuel cell. When the controller determines that there is no request for AC impedance measurement of the fuel cell, the controller may end the control or may maintain the present amplitudes which increase and decrease the duty ratios. On the other hand, when the controller determines that there is a request for AC impedance measurement of the fuel cell, the controller acquires the current waveforms flowing through the coils just before the measurement of the AC impedance of the fuel cell. Then, from the acquired current waveforms, the controller determines whether or not the following condition as the condition 1 is met: "the operating condition in which, when the switches of the n phases are operated at different phases, and when the currents flowing through the coils are in the discontinuous mode and the current value flowing through the coil of one of the n phases is kept at zero, the switch connected to the coil of at least one of the remaining phases is switched from ON to OFF". Then, when the controller determines that the condition 1 is met, the controller makes the amplitudes which increase and decrease the duty ratios, large compared to other operating conditions so that the target current amplitude values become B (B>A). On the other hand, when the controller determines that the condition 1 is not met, the controller measures the AC impedance of the fuel cell with maintaining the present amplitudes which increase and decrease the duty ratios so that the target current amplitude values become A.

The current waveforms flowing through the coils just before the measurement of the AC impedance of the fuel cell, may be current waveforms one cycle before the switching period, for example. The switching period is about 30 kHz, for example. The operating condition of the switching period is almost the same as the operating condition of the period one cycle before the switching period, and it is thought that the dead zone occurrence region in FIG. 11 is the same between the switching period and the period one cycle before the switching period. Accordingly, the controller accurately determines whether or not the condition 1 is met.

REFERENCE SIGNS LIST

10: Fuel cell
20: Step-up converter
21: Reactor
22: Current sensor
23: Switch
24: Diode
25: Capacitor
50: External load

The invention claimed is:

1. A fuel cell system,
wherein the fuel cell system comprises a fuel cell and a converter for carrying out at least one selected from the group consisting of step-up and step-down of output voltage of the fuel cell;
wherein the converter comprises:
a reactor comprising coils of two phases, which are magnetically coupled to each other,
switches of the two phases, which are connected to the coils, and
a controller;
wherein the controller controls ON and OFF of the switches of the n phases;
wherein the controller monitors current values of the coils;
wherein the controller operates the switches of the two phases at a phase difference of 180°;
wherein the controller operates duty ratios of the switches of the two phases with periodically increasing and decreasing them, and the controller measures an AC impedance of the fuel cell from a current waveform of and a voltage waveform of the fuel cell; and
wherein, when the controller determines that the following condition 1 is met, the controller makes amplitudes of the current values of the coils which increase and decrease the duty ratios large compared to other operating conditions:
Condition 1: an operating condition in which, when the switches of the two phases are operated at a phase difference of 180°, and when currents flowing through the coils are in a discontinuous mode and the duty ratios of the switches of the two phases are less than 50% (D <0.5) and satisfy any one of the following formulae (A) and (B):

$$D < \{(1/2)(L-M)(V_H - V_L)\}/(LV_L + MV_L - MV_H) \quad \text{Formula (A)}$$

$$D < (1/2)\{1 - (V_L/V_H)\} \quad \text{Formula (B)}$$

where L is self-inductance of the reactor; M is mutual inductance of the reactor; $V_H$ is an outlet voltage of the converter; $V_L$ is an inlet voltage of the converter; and D is the duty ratio (-).

2. The fuel cell system according to claim 1,
wherein the controller preliminarily stores a data group showing a relationship between the inlet voltage of the converter, the outlet voltage of the converter, the duty ratios of the switches and the current values of the coils, and
wherein, when the controller determines that the condition 1 is met, the controller refers to the data group and makes the amplitudes which increase and decrease the duty ratios of the switches of the two phases, large compared to other operating conditions.

3. The fuel cell system according to claim 1,
wherein the controller confirms whether or not there is a request for AC impedance measurement of the fuel cell;
wherein, when the controller confirms that there is a request for AC impedance measurement of the fuel cell, the controller determines whether or not the condition 1 is met; and wherein, when the controller determines that the condition 1 is met, the controller makes the amplitudes which increase and decrease the duty ratios of the switches of the two phases, large compared to other operating conditions, and the controller measures the AC impedance of the fuel cell.

4. The fuel cell system according to claim 1, wherein the input voltage ($V_L$) into the converter is 20 V and the average current value of the coils flowing through the reactor is 9 A;

wherein, when the controller determines that the condition 1 is not met, the controller is configured to increase and decrease the duty ratios in a range of from 23% to 33%, the controller is configured to increase and decrease the current values of the coils between 6 A and 12 A, and the amplitudes of the currents are ±3 A; and wherein, when the controller determines that the condition 1 is met, the controller is configured to increase and decrease the duty ratios in a range of from 14% to 38%, the controller is configured to increase and decrease the current values of the coils between 4 A and 14 A, and the amplitudes of the currents are ±5 A.

* * * * *